(12) United States Patent
Lemke et al.

(10) Patent No.: US 8,805,347 B2
(45) Date of Patent: Aug. 12, 2014

(54) CALLER IDENTIFICATION FOR MISSED CALLS

(75) Inventors: Mark R. Lemke, Mundelein, IL (US); Ramy S. Ayoub, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 656 days.

(21) Appl. No.: 13/170,274

(22) Filed: Jun. 28, 2011

(65) Prior Publication Data

US 2013/0005315 A1   Jan. 3, 2013

(51) Int. Cl.
*H04M 3/42* (2006.01)
*H04M 3/436* (2006.01)
*H04M 3/53* (2006.01)

(52) U.S. Cl.
CPC ...... *H04M 3/42195* (2013.01); *H04M 2201/41* (2013.01); *H04M 3/436* (2013.01); *H04M 3/53* (2013.01)
USPC ............... 455/415; 379/88.19; 379/88.21; 379/88.23; 379/88.02; 704/246; 704/251

(58) Field of Classification Search
CPC ............... H04M 3/42042; H04M 3/42068; H04M 1/57; H04M 1/663; H04M 3/533; G10L 17/005; G10L 15/22; G07C 9/00071
USPC .......... 455/415; 379/88.19, 88.21, 88.23, 379/88.02; 704/246, 251
See application file for complete search history.

(56) References Cited

U.S. PATENT DOCUMENTS

| | | | |
|---|---|---|---|
| 6,724,866 B2 | 4/2004 | Kuhn et al. | |
| 7,437,287 B2 | 10/2008 | Kim | |
| 7,664,636 B1 | 2/2010 | Hirschberg et al. | |
| 2008/0159488 A1 | 7/2008 | Raja | |
| 2008/0215323 A1 | 9/2008 | Shaffer et al. | |
| 2008/0273677 A1* | 11/2008 | Alfano et al. | 379/93.17 |
| 2010/0166161 A1* | 7/2010 | Dhawan et al. | 379/88.19 |
| 2011/0026698 A1* | 2/2011 | Kuhlke et al. | 379/142.04 |

OTHER PUBLICATIONS

Patent Cooperation Treaty, International Search Report and Written Opinion of the International Searching Authority for International Application No. PCT/US2012/042121, Sep. 14, 2012, 10 pages.

* cited by examiner

*Primary Examiner* — Wayne Cai
(74) *Attorney, Agent, or Firm* — Shumaker & Sieffert, P.A.

(57) ABSTRACT

Methods and devices are provided for identifying a caller after receiving a missed call from a calling device that is not associated with the caller. An exemplary method involves obtaining an audio message from the caller, recognizing the caller as being a first contact of the called individual by matching an audio sample associated with the first contact to at least a portion of the audio message, and graphically indicating an association between the first contact and the missed call after recognizing the first contact as the caller.

10 Claims, 6 Drawing Sheets

CALLER IDENTIFICATION FOR MISSED CALLS

TECHNICAL FIELD

Embodiments of the subject matter described herein relate generally to communications devices and systems, and more particularly, embodiments of the subject matter relate to identifying a known contact after a missed call from a device that is not associated with that contact.

BACKGROUND

Call screening is commonly employed by individuals to decide whether an incoming call should be answered. Often, an individual will decline to answer an incoming call from a phone number that he or she does not recognize, due to the likelihood of that call being initiated by a telemarketer, prank caller, or an otherwise unfamiliar person (e.g., a nuisance call). In other cases, an individual may decline to answer an incoming call from a phone number that he or she recognizes to avoid talking to the particular individual associated with that phone number at that time.

While call screening may be convenient or beneficial in many circumstances, call screening can also have unanticipated or otherwise unintended consequences. For example, the incoming call may be from a known contact that the individual is anticipating a call from or whom the individual would otherwise desire to answer calls from, however, the incoming call may be from a phone number that is unfamiliar to the individual (e.g., due to that known contact's mobile device lacking service at his current location or lacking sufficient battery power to make the call, or when that contact has changed mobile devices or phone numbers). Furthermore, in some situations, the known contact may have an urgent need to reach the called individual but may be unable to do so due to the call screening by the called individual, and at the same time, the called individual is unaware of the known contact's urgent need to reach the called individual. Accordingly, it is desirable to mitigate undesirable or otherwise unintended consequences of call screening.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration," and any implementation described herein as exemplary is not necessarily to be construed as preferred or advantageous over other implementations. Furthermore, there is no intention to be bound by any expressed or implied theory presented in the preceding technical field, background, or the following detailed description.

Embodiments of the subject matter described herein relate to identifying the caller responsible for a missed call after receiving at least a portion of an audio message from the caller. As used herein, a "missed call," "rejected call," or variants thereof should be understood as referring to a failed attempt to establish real-time audio communications between the user of the call-initiating device (or calling device) and the user of the targeted device for the call, or, in other words, a failure to establish communications between the caller (or calling party) and the call recipient (or called party). As described in greater detail below, after the user of the targeted device (or called device) fails to answer the incoming call from the calling device, the caller (i.e., the user of the calling device) provides an audio message intended for the user associated with the targeted device. The received audio message (or a portion thereof) is compared to one or more audio samples associated with the called individual's contacts or other known callers of the targeted device (e.g., contacts in the called individual's phone book or contact list on the targeted device), and speech recognition (or voice recognition) techniques are used to match the source of the received audio message to one of the audio samples associated with one of the called individual's known contacts, thereby identifying that matching contact as being responsible for the missed call.

After the received audio message is matched to a known contact, the user is graphically indicated of the association between the missed call and the matching contact. For example, after the missed call, the targeted device initially displays a graphical indication of the missed call as being from the calling device (e.g., in a call history display or missed calls display), and indicates that the user of the calling device is unknown or otherwise unfamiliar if the calling device does not correspond to any of the called individual's contacts. Subsequently, in response to matching the received audio message to a known contact using voice-recognition techniques, the targeted device automatically updates the display on the targeted device to identify that the missed call from the calling device was attributable to or otherwise associated with the matching contact. In this regard, when the calling device is unknown to the user of the targeted device (e.g., the missed call is from an unknown number), the user of the targeted device may be apprised that the missed call is attributable to a caller that the user is familiar with. In response, the user of the targeted device may decide to promptly return a call to the caller (e.g., by calling the number associated with the missed call or calling a different number previously associated with the matched contact) or listen to the received audio message, rather than ignoring the missed call or audio message for an extended period of time.

Figure 1:
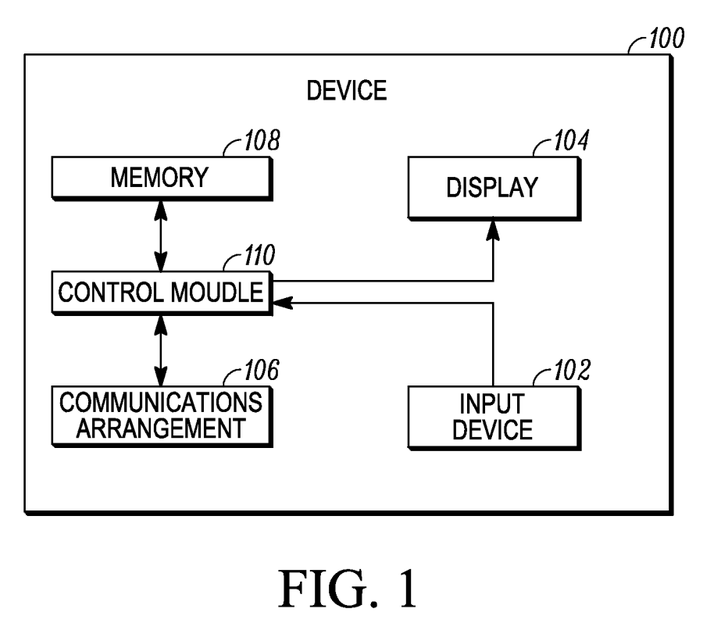
FIG. 1 is a block diagram of an exemplary electronic device in accordance with one embodiment.

FIG. 1 depicts an exemplary embodiment of an electronic device 100 such as, a mobile communications device (e.g., cellular phone, tablet, personal digital assistant, and the like), a computer, a telephone, a set top box, or another suitable electronic device capable of receiving or otherwise routing incoming calls. In an exemplary embodiment, the electronic device 100 includes, without limitation, an input device 102, a display device 104, a communications arrangement 106, a memory 108, and a control module 110. It should be understood that FIG. 1 is a simplified representation of an electronic device 100 for purposes of explanation and is not intended to limit the scope of the subject matter in any way.

In the illustrated embodiment, the input device 102 generally represents the hardware, software, firmware, or combinations thereof configured to provide a user interface with the electronic device 100. Depending on the embodiment, the input device 102 may be realized as a key pad, a keyboard, one or more buttons, a touch panel, a touchscreen, an audio input device (e.g., a microphone), or the like. The control module 110 is coupled to the input device 102 to receive input from the user of the electronic device 100 via the input device 102 and facilitate operation of the electronic device 100 in accordance with the received user input. The display device 104 is realized as an electronic display configured to graphically display information or content under control of the control module 110. Depending on the embodiment, the display device 104 may be realized as a liquid crystal display, a light emitting diode display, an organic light emitting diode display, a plasma display, or another suitable electronic display. The control module 110 is coupled to the display device 104, and the control module 110 controls the display and rendering of content on the display device 104, as described in greater detail below. The communications arrangement 106 generally represents the hardware, software, firmware, or combinations thereof configured to transmit and receive incoming communications and signals directed to and from the electronic device 100 via one or more communications channels in a conventional manner. In this regard, in practice, the communications arrangement 106 may include one or more amplifiers, filters, modulators, and demodulators, digital-to-analog converters, analog-to-digital converters, mixers, antennas, and the like. The communications arrangement 106 is coupled to the control module 110, and the communications arrangement 106 and the control module 110 are cooperatively configured to support communications to and from the electronic device 100 in a conventional manner, as will be appreciated in the art.

In an exemplary embodiment, the control module 110 generally represents the hardware, software, firmware, processing logic, or other components of the electronic device 100 configured to support operation of the electronic device 100 and execute various functions or processing tasks described in greater detail below. Depending on the embodiment, the control module 110 may be implemented or realized with a general purpose processor, a microprocessor, a controller, a microcontroller, a state machine, a content-addressable memory, an application-specific integrated circuit, a field-programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the control module 110, or in any practical combination thereof. The memory 108 represents any non-transitory short or long term storage medium capable of storing programming instructions for execution by the control module 110, including any sort of random access memory, read only memory, flash memory, registers, hard disks, removable disks, magnetic or optical mass storage, or the like. The programming instructions, when read and executed by the control module 110, cause the control module 110 to perform certain tasks, operations, functions, and processes described in more detail herein.

In an exemplary embodiment, the memory 108 stores or otherwise maintains information pertaining to contacts of the user of the electronic device 100, that is, potential callers of the electronic device 100 that the user is familiar with. For example, the memory 108 may support a contact list or phone book feature, wherein the memory 108 includes, for each respective contact, a name associated with that contact (e.g., the contact's given name, nickname, or the like), an image associated with that contact (e.g., a photograph of the contact), and contact information associated with that contact (e.g., one or more phone numbers, email addresses, and the like). Additionally, the memory 108 may also store one or more audio samples associated with each contact, wherein each of the audio samples consists of previously recorded audio spoken by its associated contact. As described in greater detail below, the audio samples function as models used by the control module 110 when performing speech recognition (or voice recognition) on a received audio message to identify the source of the audio message.

Figure 2:
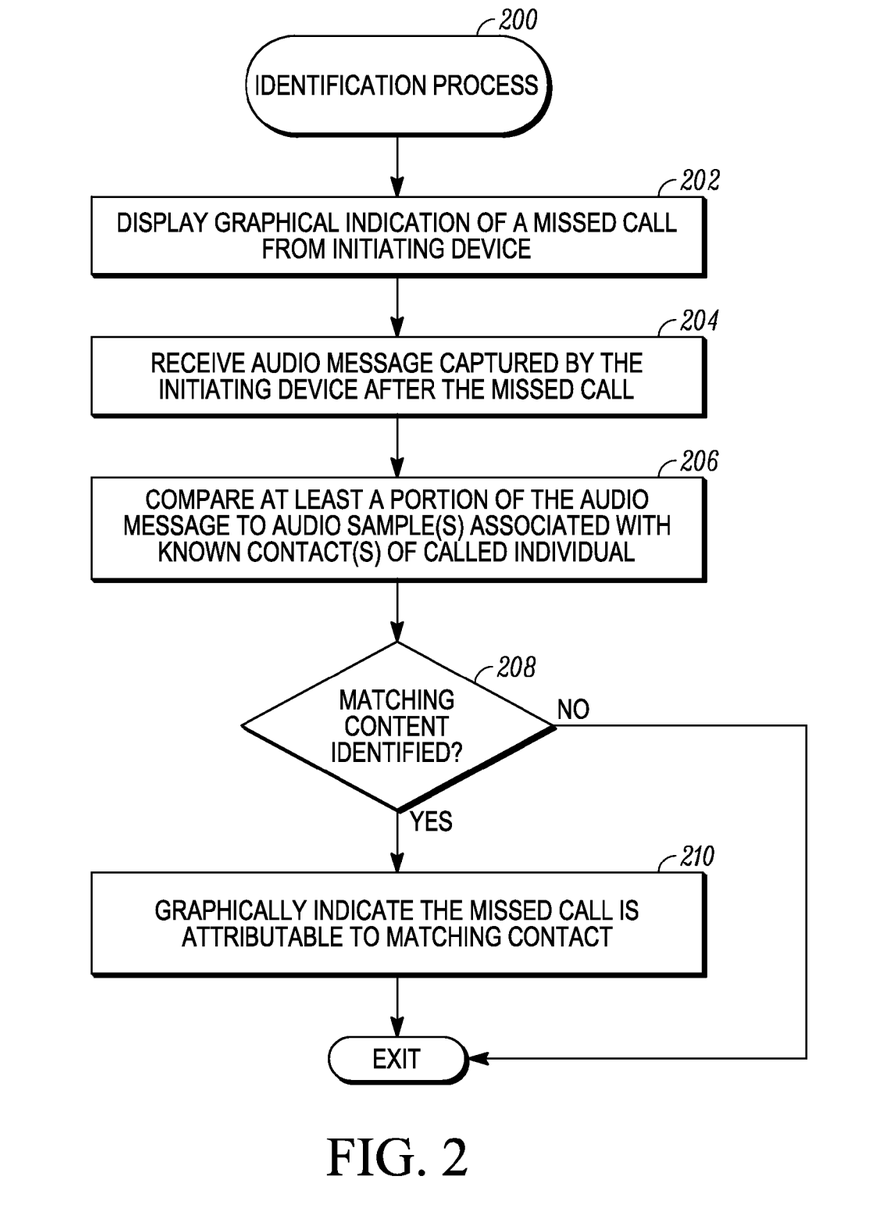
FIG. 2 is a flow diagram of an identification process suitable for use with the electronic device of FIG. 1 in accordance with one embodiment.

Turning now to FIG. 2, in an exemplary embodiment, the electronic device 100 is configured to perform an identification process 200 and additional tasks, functions, or operations as described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 104, the memory 108, or the control module 110. It should be appreciated any number of additional or alternative tasks may be included and may be incorporated into a more comprehensive procedure or process having additional functionality not described in detail herein.

Referring to FIG. 2, and with continued reference to FIG. 1, the identification process 200 may be performed by a targeted device (or called device) after a missed call to the targeted device to identify, to the user of the targeted device, the source of the missed call. In this regard, the identification process 200 does not begin until after a failed attempt to establish communications with the user of the targeted device. For example, the caller may manipulate the call initiating device (or calling device) to initiate an attempt to establish communications with the targeted device. Subsequently, the targeted device may notify its user (e.g., auditorily, visually, or haptically) of the incoming call, and in response, the user of the targeted device may ignore or otherwise refuse to answer the incoming call (e.g., by manipulating the input device 102 or by letting the incoming call timeout).

Figure 3:
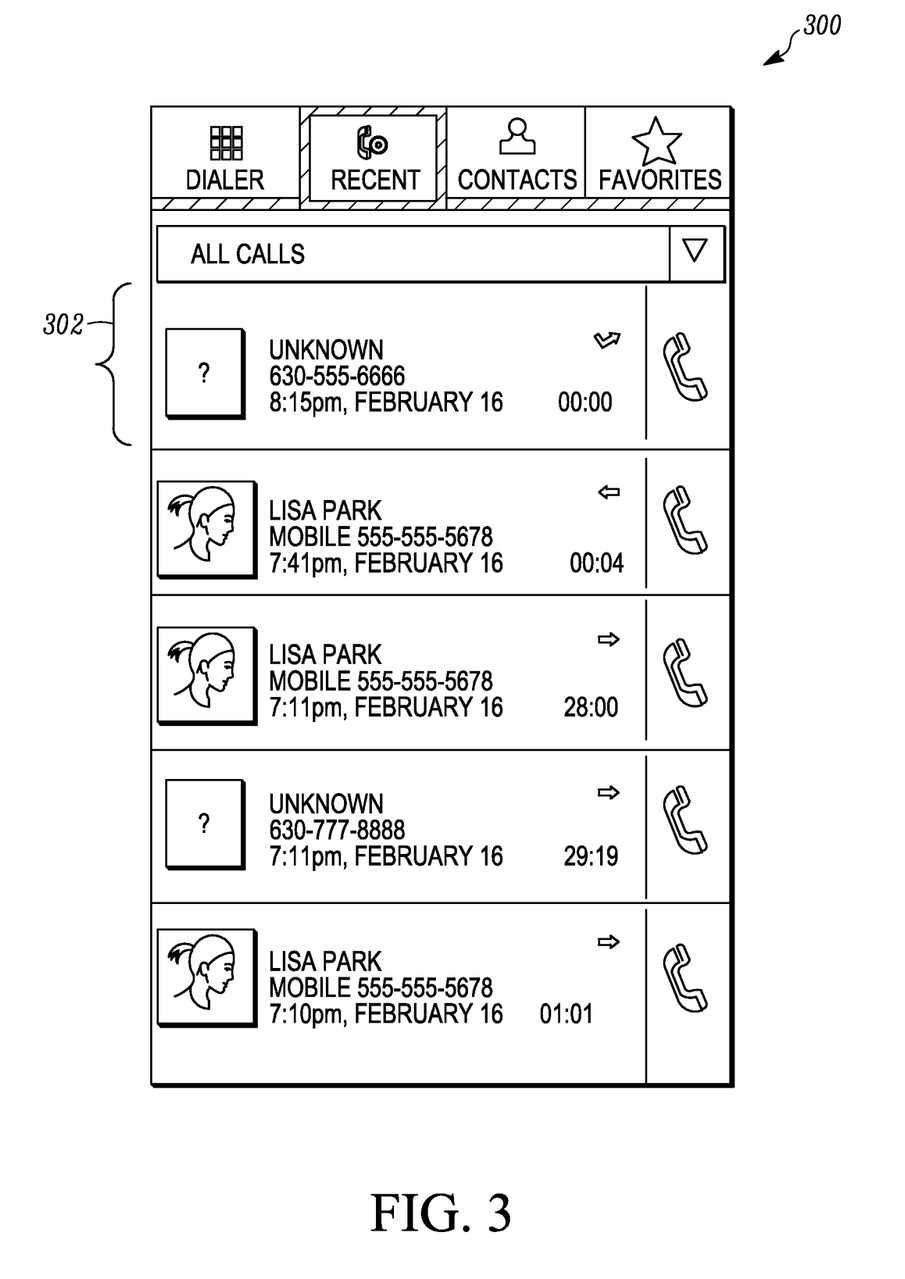
FIG. 3 depicts an exemplary call history display suitable for display by the electronic device of FIG. 1 in accordance with one embodiment.

In an exemplary embodiment, the identification process 200 begins by displaying or otherwise providing a graphical indication of the missed call from the calling device (task 202). In this regard, the control module 110 may identify or otherwise obtain an identifier associated with the calling device, such as a phone number associated with the calling device, and display, on the display device 104, a graphical indication of a missed call that includes or otherwise incorporates the phone number associated with the calling device, thereby indicating that the missed call is from the calling device. For example, as illustrated in FIG. 3, the control module 110 may display, on the display device 104, a call history 300 that includes a listing of previous calls to or from the targeted device 100. In response to the missed call from the calling device, the control module 110 may update the call history 300 to include an entry 302 corresponding to the missed call from the calling device. As illustrated, the missed call entry 302 corresponding to the calling device includes the phone number associated with the calling device. In an exemplary embodiment, the control module 110 searches the contact list maintained by memory 108 for a contact associated with the phone number of the calling device. In response to failing to identify a contact in the memory 108 having an associated phone number matching the phone number of the calling device, the control module 110 modifies the displayed missed call entry 302 to indicate that the calling device is not associated with any of the user's contacts (e.g., the missed call is attributable to an unknown caller). Conversely, if the control module 110 identifies a contact in memory 108 associated with a phone number matching the phone number of the calling device, the control module 110 updates the missed call entry to display information associated with that contact in connection with the graphical indication of the missed call (e.g., the name or image associated with that contact).

Referring again to FIG. 2, in an exemplary embodiment, the identification process 200 continues by receiving an audio message (e.g., a voicemail message) from the user of the calling device after the missed call has occurred (task 204). In this regard, after the targeted device fails to answer the incoming call from the calling device, the caller may be prompted to leave a message for the user of the targeted device (e.g., by playing back a voicemail greeting for the user of the targeted device). In response, the caller may begin speaking or otherwise providing audio that is captured, recorded, or otherwise received by the calling device and transmitted to the targeted device, wherein the targeted device may receive the audio message (e.g., via the communications arrangement 106) and store the audio message in memory 108.

In an exemplary embodiment, after receiving at least a portion of the audio message from the caller, the identification process 200 continues by comparing the received portion of the audio message to the audio samples associated with contacts of the called individual to determine or otherwise identify whether the audio message matches a known caller of the targeted device (task 206). In this regard, the control module 110 obtains one or more audio samples from the memory 108 and performs speech-recognition or voice-recognition techniques using the obtained audio samples as speaker models to attempt to match the audio message to one of the audio samples, and thereby match the source of the audio message to one of the user's contacts. In an exemplary embodiment, the control module 110 compares the received audio message (or a portion thereof) to each of the audio samples in the memory 108 until identifying an audio sample in the memory 108 that matches the received audio from the caller with a sufficiently high level of confidence that the received audio and the stored audio sample have a common speaker. As illustrated in FIG. 2, when the identification process 200 is unable to identify a matching contact after comparing the received audio message to all of the stored audio samples, the identification process 200 exits, and the displayed call history remains unaltered (i.e., call history 300 and missed call entry 302 remain in the state illustrated in FIG. 3).

Figure 4:
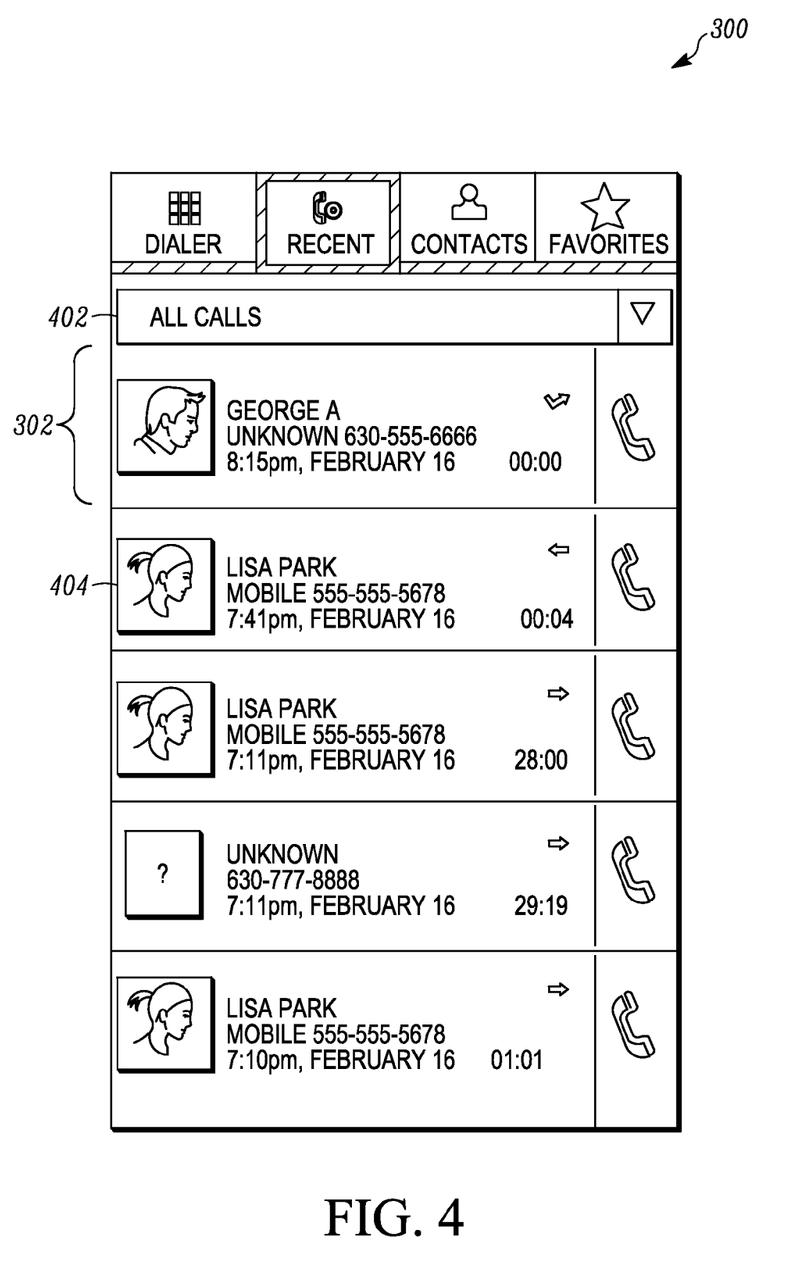
FIG. 4 depicts the updated call history display of FIG. 3 in accordance with one exemplary embodiment of the identification process of FIG. 2.

In response to identifying or otherwise determining that one of the stored audio samples matches the speaker of the received audio message, the identification process 200 continues by graphically indicating that the missed call is attributable to the contact associated with the audio sample that matches the received audio message (task 210). In this regard, the control module 110 obtains, from the memory 108, one or more attributes associated with the contact associated with the matching audio sample (e.g., the name of the matching contact, the image associated with the matching contact, and the like) and displays the obtained attributes associated with the matching contact on the display device 104 in association with the graphical indication of the missed call. For example, as illustrated in FIG. 4, the control module 110 may automatically update the missed call entry 302 in the call history 300 in response to identifying a matching contact by displaying, in the missed call entry 302, the name 402 associated with the matching contact (e.g., the matching contact's first name) and the image 404 associated with the matching contact (e.g., a picture of the matching contact stored in memory 108). In this manner, the stored attributes for the matching contact (e.g., the name and picture) are displayed in association with or otherwise in proximity to the identifier of the calling device (e.g., the unknown number associated with the calling device), thereby indicating that the missed call is attributable to a contact or caller that is known to the user of the targeted device 100 when there is no pre-existing association between that contact and the calling device or when that contact is associated with a phone number or device different from the calling device. As a result, when the called individual views the call history 300 on the targeted device 100, the called individual can readily ascertain that the missed call from an unknown number was from a known contact, such as, for example, a known contact that the called individual was anticipating a call from or is otherwise interested in speaking to. In response, the user of the targeted device 100 may promptly respond to the missed call in an appropriate manner (e.g., placing a call to the unknown number, listening to the received audio message, etc.) rather than disregarding the missed call as a nuisance call. As illustrated in FIG. 4, the identification process 200 may continue displaying an indication within the missed call entry 302 that the missed call was from an unknown phone number or device rather than a phone number or device associated with the matching contact in memory 108.

Still referring to FIG. 2, it should be noted that although not illustrated in FIG. 4, in addition to graphically indicating that the missed call was associated with or otherwise attributable to a known contact in the call history 300, the identification process 200 may also graphically indicate that the received audio message is associated with the known contact. For example, after receiving the audio message, the control module 110 may display, on the display device 104, a graphical indication of an available audio message (e.g., a voicemail notification) that includes or otherwise indicates that the audio message was from the matching contact. In a similar manner to that described above, the control module 110 may display, on the display device 104, a graphical indication of the audio message (e.g., a voicemail notification) that includes one or more attributes associated with the matching contact (e.g., the matching contact's name, picture, or the like), thereby indicating that the received audio message was provided by a known contact. As a result, when the called individual views the voicemail notification, the called individual can readily ascertain that the voicemail message was from a known contact 402 (as opposed to an unknown source 302) and make a prompt and informed decision as to whether to return the call or to listen to the audio message, rather than indefinitely ignoring or otherwise disregarding the audio message on the basis of the audio message being from an unknown phone number or unknown device.

It should be noted that although FIGS. 3 and 4 depict an exemplary situation where the missed call was from an unknown calling device or unknown phone number (i.e., a phone number that did not match any stored in memory 108), the identification process 200 may also be performed when the missed call is from a known calling device or known phone number (i.e., a phone number that matches a contact stored in memory 108). For example, if the control module 110 identifies a contact stored in memory 108 having an associated phone number that matches the phone number associated with the calling device, the control module 110 may initially display the attributes associated with that contact (e.g., that contact's name, picture, and the like) in association with the graphical indication of the missed call. Subsequently, the control module 110 may receive the audio message (or a portion thereof) provided by the caller using the known calling device, and compare the received audio message (or a portion thereof) to one or more audio samples in memory 108 in a similar manner to that described above (e.g., tasks 204, 206). In response to identifying or otherwise determining that a stored audio sample associated with a different contact matches the speaker of the received audio message (e.g., a contact associated with a phone number different from that of the calling device), the control module 110 may automatically update the missed call entry on the display device 104 by replacing the displayed attributes corresponding to contact associated with the calling device with attributes associated with the matching contact who was identified as being the speaker of the audio message. This may be advantageous in situations where the called individual screened the incoming call that was ostensibly from the individual associated with the calling device (e.g., because the called individual does not want to speak to that individual at that time). When the called individual subsequently views the call history, the called individual can readily ascertain that the missed call was in fact from a different contact whom the called individual did not intend to screen but happened to be calling from the phone number or device associated with another contact that the called individual intended to screen.

Figure 5:
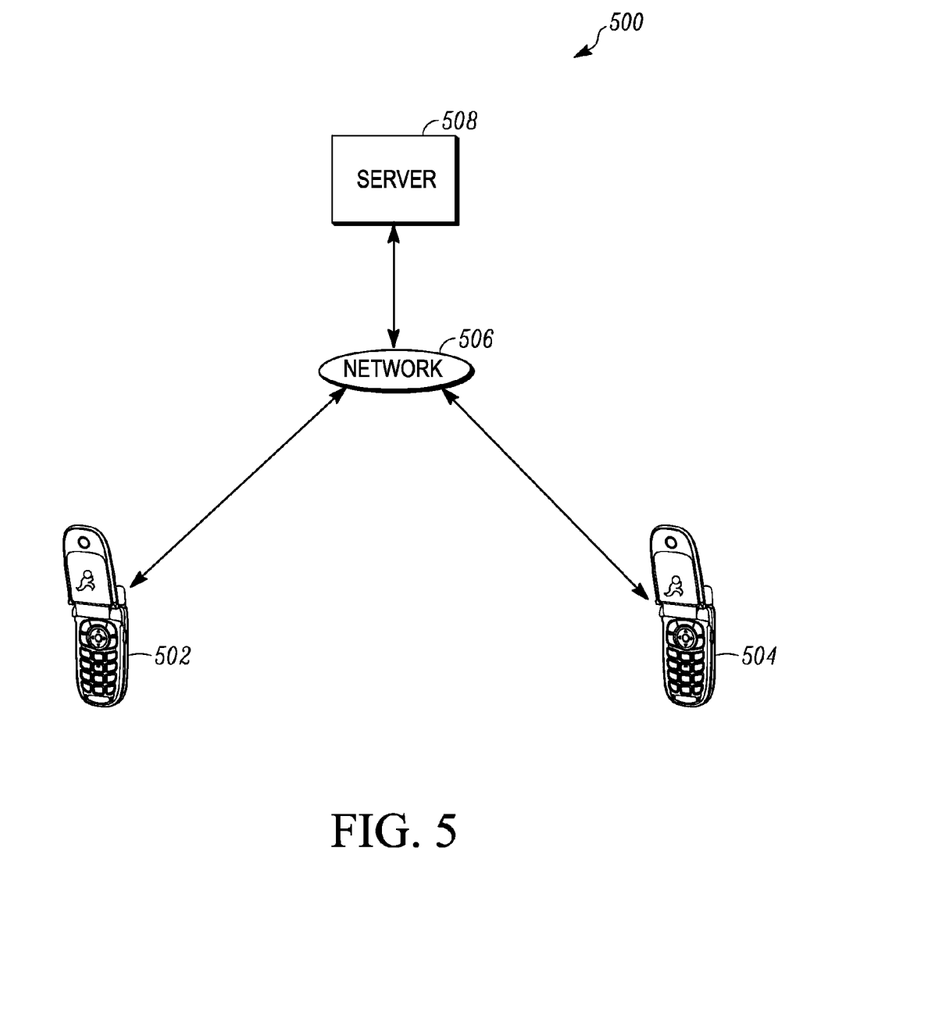
FIG. 5 is a block diagram of an exemplary communications system suitable for use with the identification process of FIG. 2 in accordance with one embodiment.

FIG. 5 depicts an exemplary communications system 500 suitable for implementing the identification process 200. The illustrated embodiment of the communications system 500 includes, without limitation, a call-initiating device 502, a targeted device 504, and a communications network 506. As illustrated, the communications network 506 is coupled to or otherwise includes a server 508 configured to support the identification process 200, as described in greater detail below. It should be understood that FIG. 5 is a simplified representation of the communications system 500 for purposes of explanation and is not intended to limit the scope of the subject matter in any way.

In an exemplary embodiment, the calling device 502 and the called device 504 are each realized as an electronic device (e.g., an electronic device 100), such as a cellular phone or another comparable mobile communications device. The communications network 506 generally represents the hardware, software, firmware, processing logic, or other infrastructure components configured to support communications between the two devices 502, 504. Depending on the embodiment, the communications network 506 may be realized as a cellular network or another suitable radio network, a switched telephone network, a computer network (e.g., using voice over IP over wide area networks or the like rather than cellular communications), or a combination thereof. For example, in practice, the communications network 506 may be realized as a combination of smaller networks associated with different service providers that may employ different communications technologies and protocols.

In the illustrated embodiment, the server 508 generally represents a computing system or other electronic device coupled to the network 506 to support the identification process 200 in connection with devices 502, 504 communicating via the network 506. In an exemplary embodiment, the server 508 includes one or more control modules or other hardware, software, firmware, processing logic, or other components configured to support operation of the identification process 200 and to execute various functions and processing tasks described in greater detail below. Additionally, the server 508 includes memory that stores or otherwise maintains audio samples associated with the contacts of the user of the called device 504.

Figure 6:
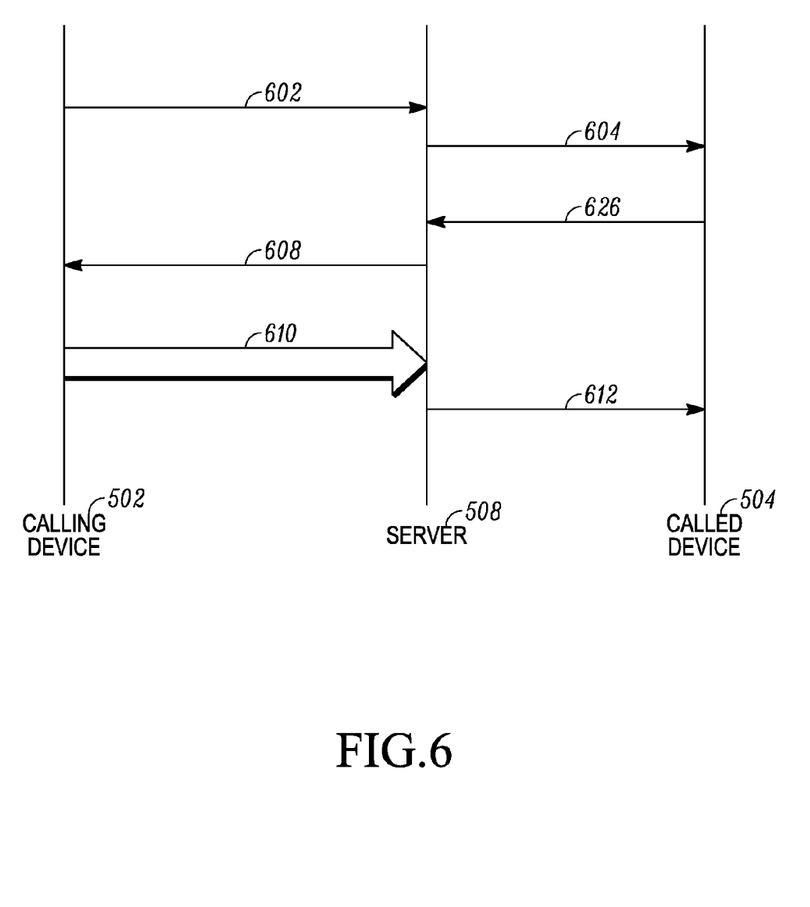
FIG. 6 is a diagram illustrating communications within the communications system of FIG. 5 in accordance with an exemplary embodiment of the identification process of FIG. 2.

FIG. 6 illustrates an exemplary sequence of communications within the communications system 500 in accordance with an exemplary embodiment of the identification process 200. As illustrated, the communications begin after the caller has manipulated or otherwise operated the calling device 502 place a call to the target device 504, thereby transmitting, via the network 506, signals or information 602 to the server 508 indicating a desire to establish communications between the user of the calling device 502 and the user of the target device 504. In response, the server 508 transmits, via the network 506, corresponding signals or information 604 to the target device 504 for establishing communications between the devices 502, 504. In the illustrated embodiment, the user of the targeted device 504 fails to answer the incoming call due, for example, to the phone number of the calling device 502 being unknown to the user of the target device 504 (e.g., the phone number of the calling device 502 is not associated with any of the called individual's contacts), resulting in the targeted device 504 transmitting signals or information 606 indicative of the failure to establish communications between the devices 502, 504. In some embodiments, the information 606 transmitted back via the network 506 by the targeted device 504 also may include the voicemail greeting for the user of the targeted device 504, while in other embodiments, the voicemail greeting for the user of the targeted device 504 may be maintained in the memory on the server 508. As described above, after the failure to answer the incoming call from the calling device 502, the called device 504 is configured to display a missed call entry indicating the missed call from the calling device 502 (e.g., task 202). For example, the called device 504 may display call history including a missed-call entry corresponding to the calling device 502 in a similar manner to that described above in the context of FIG. 3.

Still referring to FIG. 6, in response to the signals or information 606 from the called device 504 indicating that the attempt to establish communication was unsuccessful, the server 508 transmits signals or information 608 back to the calling device 502 indicating the missed call along with the voicemail greeting for the user of the called device 504. After the voicemail greeting is completed, the user of the calling device 502 begins speaking or otherwise providing an audio message 610 which is captured or otherwise recorded by the calling device 502 and transmitted to the server 508 via the network 506. The server 508 receives the audio message 610 from the calling device 502 (task 204) and after receiving at least a portion of the audio message 610, begins comparing the received audio message 610 (or a portion thereof) to one or more audio samples stored on the server 508 that are associated with known callers of the called device 504 (e.g., contacts of the user of the called device 504) (task 206). In response to identifying or otherwise determining that the speaker of one of the stored audio samples matches the speaker of the received audio message 610 (task 208), the server 508 transmits signals or information 612 to the called device 504 indicating the matching contact associated with the recently missed call. In response to receiving indication of the matching contact associated with the missed call, the called device 504 automatically updates the graphical indication of the missed call to indicate that the matching contact was associated with the missed call (task 210). For example, as described above in the context of FIG. 4, the called device 504 may automatically update the missed-call entry for the missed call from the calling device 502 to include attributes associated with the matching contact that are displayed in association with the phone number or other identifiers corresponding to the calling device 502. Additionally, it should be noted that in some embodiments, the information 612 provided by the server 508 may also indicate the availability of an audio message (or voicemail) from the matching contact, wherein in response to receiving the indication from the server 508, the called device 504 displays a graphical indication of an available audio message (e.g., a voicemail notification) that includes or otherwise indicates that the audio message was from the matching contact. It should be noted that in some embodiments, the information 612 transmitted to the called device 504 by the server 508 may include the audio message received from the calling device 502 allowing the audio message to be played back on the called device 504, while in other embodiments, the audio message 610 may be stored or otherwise maintained on the server 508, wherein the called device 504 calls or otherwise accesses the server 508 to receive the audio message (e.g., after receiving the voicemail notification).

It should be noted that although the subject matter described herein is described in the context of the graphical indication of the missed call and the associated matching contact being displayed on the called device, in practice, the graphical indication of the missed call and the associated matching contact may be displayed on a device other than the called device. For example, incoming calls to the targeted device may be routed through an intermediate device, such as a set-top box, modem, router, or the like, which includes or is otherwise coupled to a display device, such as a television, that is separate from the targeted device. In this regard, the intermediate device, such as a set-top box, may display an indication of the missed call on a television or other display device different from the display device of the targeted device and automatically update the graphical indication of the missed call to indicate the matching contact associated with the missed call or otherwise graphically indicate the availability of an audio message from the matching contact. Furthermore, in some embodiments, the intermediate device may be utilized to perform one or more of the tasks described above in the context of the server 508. For example, calls may be routed through a set-top box which also stores or otherwise maintains audio samples associated with the contacts of the user of the called device, receives the audio message from the calling device, and compares the received audio message to the one or more audio samples stored on the set-top box to identify the contact associated with the missed call.

To briefly summarize, one advantage of the subject matter described above in the context of FIGS. 1 through 6 is that a called individual may be apprised of the fact that a missed call or voicemail from an unknown phone number or device is associated with or otherwise attributable to one of the called individual's existing contacts without inconveniencing the called individual or the caller. For example, a known contact of the individual being called may borrow the mobile device of another person, whom the individual being called is unfamiliar with and having a phone number not previously associated with the known contact. The called individual may fail to recognize the phone number associated with the incoming call and screen the call. After the missed call, the called device may display a graphical indication of the missed call from the unknown number and the known contact may provide an audio message for the called individual. After the audio message has been completely received or while the audio message is still being received, the received audio message (or a portion thereof) is compared to audio samples associated with the called individual's contacts. When the audio message is matched to the known contact, the called device automatically updates the graphical indication of the missed call to include the name, picture, or other identifying information associated with matching contact to thereby indicate that the missed call is attributable to the matching contact calling from the unknown number. Additionally, the called device may graphically indicate an available audio message from the matching contact. Thus, the called individual is promptly apprised of the identify of the previously assumed "unknown" caller, thereby allowing the called individual to make an informed decision as to whether to return the phone call to the unknown number, listen to the audio message from the matching contact, or otherwise attempt to establish communication with the matching contact in an alternative manner (e.g., via e-mail, instant messaging, text messaging, or the like). It should be noted that in some embodiments, the called device may be capable of identifying the caller as one of the called individual's contacts while the caller is providing the audio message, and in such embodiments, the called individual may be able to manipulate the called device to establish communication with the caller while the caller is still in the process of providing the audio message.

For the sake of brevity, conventional techniques related to communications networks, communications devices, communications protocols and signaling, speech recognition or voice recognition, voicemail services or servers, and other functional aspects of the systems (and the individual operating components of the systems) may not be described in detail herein. Furthermore, the connecting lines shown in the various figures contained herein are intended to represent example functional relationships or physical couplings between the various elements. It should be noted that many alternative or additional functional relationships or physical connections may be present in a practical embodiment.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

We claim:

1. A method of identifying a caller, the method comprising:
   obtaining, by a target device, an audio message from the caller after a missed call from a calling device to the target device;
   recognizing, by the target device, the caller as a first contact in response to matching an audio sample associated with the first contact to at least a portion of the audio message; and
   after recognizing the caller as the first contact, graphically indicating, by the target device, an association between the first contact and the missed call;
   wherein the calling device is associated with a second contact; and wherein the first contact is associated with a first mobile device and the calling device comprises a second mobile device associated with the second contact.

2. The method of claim 1 wherein graphically indicating comprises displaying an identifier of the first contact in association with a graphical indication of the missed call.

3. The method of claim 2:
wherein graphically indicating comprises displaying a missed call entry on the target device; and
wherein displaying the identifier comprises updating the missed call entry on the target device to include the identifier of the first contact after matching the portion of the audio message to the audio sample associated with the first contact.

4. The method of claim 2 wherein the identifier of the first contact is a name associated with the first contact or an image associated with the first contact.

5. The method of claim 1 further comprising:
graphically indicating the caller associated with the missed call is unknown prior to recognizing the caller as the first contact;
wherein graphically indicating the association between the first contact and the missed call comprises updating the graphical indication of the missed call to include an identifier associated with the first contact.

6. The method of claim 1 wherein graphically indicating comprises displaying a first identifier associated with the first contact proximate a second identifier associated with the calling device.

7. The method of claim 6 wherein:
the first identifier is a name or an image associated with the first contact; and
the second identifier is a number associated with the calling device.

8. The method of claim 1 wherein there is no pre-existing association between the first contact and the calling device.

9. The method of claim 1 further comprising:
displaying a graphical indication of the missed call on the target device prior to recognizing the first contact;
wherein the graphical indication of the missed call includes an identifier associated with the second contact; and
wherein graphically indicating the association between the first contact and the missed call comprises updating the graphical indication of the missed call to include an identifier associated with the first contact automatically in response to recognizing the first contact.

10. The method of claim 1 wherein graphically indicating comprises graphically indicating that the first contact is associated with the missed call on a third device.

* * * * *